Dec. 1, 1931.    C. S. HALL    1,834,614
AIR CELL FOR AIRCRAFT
Original Filed June 10, 1929    2 Sheets-Sheet 1
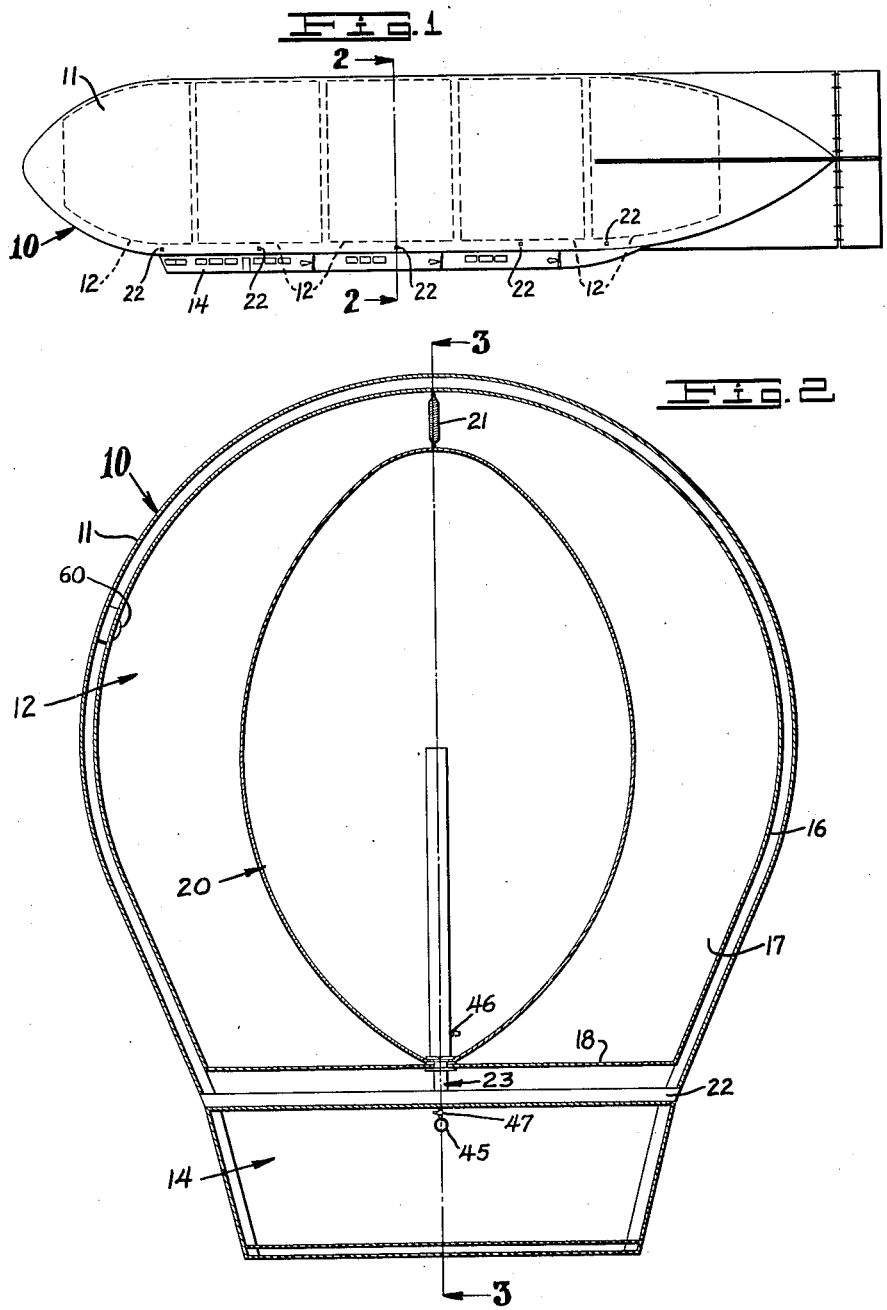
INVENTOR.
C. S. HALL
BY
ATTORNEY.

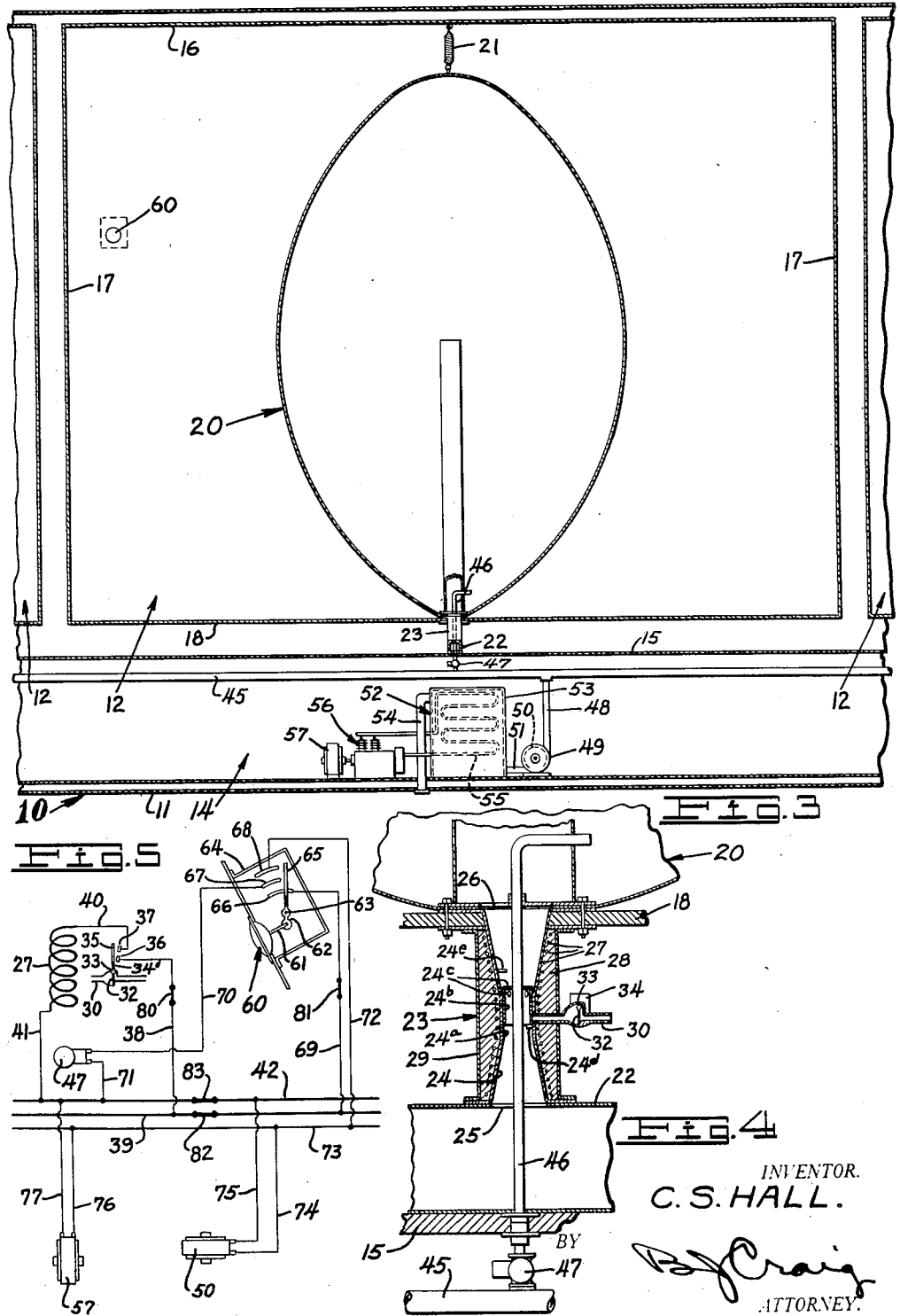

Patented Dec. 1, 1931

1,834,614

UNITED STATES PATENT OFFICE

CHARLES S. HALL, OF LOS ANGELES, CALIFORNIA

AIR CELL FOR AIRCRAFT

Application filed June 10, 1929, Serial No. 369,554. Renewed April 20, 1931.

This invention relates to improvements in aircraft.

The general object of this invention is to provide an improved gas container for aircraft and more particularly for lighter-than-air aircraft of the dirigible type.

A more specific object of the invention is to provide a lighter-than-air aircraft wherein the gas containers include flexible air cells which are open to the atmosphere.

Another object of the invention is to provide means whereby when air is drawn into the air cell the in-going air will be heated.

A further object of the invention is to provide novel means for cooling the air in the air cell of a dirigible.

Other objects and the advantages of this invention will be apparent from the following description taken in connection with the accompanying drawings wherein:

Fig. 1 is a side elevation of an aircraft of the dirigible type embodying the features of my invention.

Fig. 2 is an enlarged transverse section taken on line 2—2 of Fig. 1.

Fig. 3 is a fragmentary longitudinal section taken on line 3—3 of Fig. 2.

Fig. 4 is an enlarged central section through one of the air cell inlets showing fragments of various other parts of the air cell; and Fig. 5 is a diagrammatic view showing the electrical wiring employed in the use of my invention.

Referring to the drawings by reference characters I have indicated generally at 10 a lighter-than-air aircraft of the dirigible type embodying the features of my invention. The aircraft 10 comprises an outer envelope 11 having one or more gas holding compartments 12 therein and including a cabin portion 14 separated from the gas holding compartments by a partition 15. As shown each of the gas compartments 12 is of rigid construction and includes curved top and side walls 16, end walls 17 and a bottom wall 18.

Within each of the gas compartments 12 I provide an air cell indicated generally at 20 which is made of a gas tight fabric and is shown as resiliently supported from the top of the gas compartment by a coiled spring 21.

For conveying air to and from the air cells 20 I provide adjacent each gas compartment a conduit 22 which is shown as extending transversely of the aircraft and being open to the atmosphere at each end. Intermediate the length of each of the conduits I provide a connecting conduit 23 which leads to the associated air cell. As clearly shown in Fig. 4 each of the connectors 23 include an inner member 24 formed in the shape of a Venturi tube having a straight throat portion 24$^a$ and having one end secured to the conduit 22 which is provided with an aperture 25 communicating with the interior of the member 24. The opposite end of the member 24 extends through the bottom wall 18 of the gas compartment to which it is secured in gas tight engagement. The air cell 20 is provided with an aperture 26 which communicates with the interior of the member 24.

Within the straight throat portion 24$^a$ I provide a floating valve 24$^b$ which includes a plurality of apertures 24$^c$ and is adapted to rest on a stop 24$^d$ and be restricted in its upward movement by a stop 24$^e$. This valve is preferably made of a thin light weight material such as aluminum so that the upward suction of air into the air cell will lift the valve, as will be more fully described hereinafter.

Surrounding the inner member 24 I provide an electrical resistance or heating coil 27 which may be of any desired construction and is shown as encased in an insulating material 28 which is provided with a protective covering 29.

Extending transversely from one side of the member 24 I provide a tube 30 which communicates with the interior of the member 24 at the straight throat portion 24$^a$ of the venturi.

As shown the tube 30 includes an enlarged portion to receive a flapper valve 32 secured to a shaft 33. The shaft 33 extends into a switch box 34 and is adapted to actuate the switch contained therein. This switch may be of any desired construction.

When the gas in one of the compartments 12 expands the pressure created thereby collapses the air cell 20 thereby forcing the air in the air cell out through the lateral 23 and the conduit 22. As the air is thus forced outward it forces the valve 24$^a$ down against the stop 24$^d$ thereby closing the entrance into the tube 30 thus preventing a suction from being created in the tube.

When the gases in the compartment 12 cool they contract and occupy less area whereupon the atmospheric air enters the air cell through the conduit 22 and the lateral 23 to expand the air cell 20 to compensate for the decreased volume of the gases. As the air passes into the air cell through the Venturi tube member 24 it moves the valve 24$^a$ upward against the stop 24$^e$ thereby raising the lower end of the valve above the tube 30, whereupon a suction is created in the tube 30 which causes the flapper valve 32 to swing upward thereby turning the shaft 33.

As shown in Fig. 5 the shaft 33 is provided in the switch box with an arm 34' which includes an electrical contact bar 35. This contact bar is adapted, when the flapper valve 32 is moved upward, to bridge a pair of electrical contacts 36 and 37. The contact 36 is connected by a wire 38 to a main negative feed wire 39 and the contact 37 is connected by a wire 40 to one end of the heating coil 27 while the opposite end of the heating coil is connected by a wire 41 to a main positive feed wire 42.

Thus when air is being drawn into the air cell the flapper valve 30 closes the circuit to the heating coil 27 which heats the air as it passes into the air cell. By thus heating the air as it passes into the air cell the heat radiating from the air cell warms the gases in the gas holding compartment 12 and causes it to expand thereby increasing the lifting capacity thereof.

For cooling the air in the air cells 20 I provide a main pipe 45 from which laterals 46 extend through the conduits 22 and through the laterals 23 into the air cells 20. The passageway through each of the laterals 46 is adapted to be controlled by an automatic electrical control valve 47 which may be of any desired type. Air is forced into the main pipe 45 through a pipe 48 from a pump 49 which is adapted to be operated by an electric motor 50 and the pump draws air therein through a pipe 51 from a cooler indicated generally at 52. This cooler includes a casing 53 having an air inlet pipe 54 from the exterior of the aircraft and a cooling coil 55 therein. The cooling coil 55 is adapted to be supplied with a cooling fluid from a refrigerating device indicated generally at 56 which may be of any desired type and is shown as adapted to be driven by an electric motor 57.

For controlling the operation of the cooling system I provide in each of the gas holding compartments a pressure actuated diaphragm 60 arranged partly within the gas holding compartment. As shown in Fig. 5 the diaphragm 60 includes a shaft 61 which is pivotally connected to an arm 62 which is pivoted as at 63 to a housing 64. The arm 62 includes a contact bar 65 which is adapted to bridge contact tracks 66, 67 and 68.

The contact track 66 is connected by a wire 69 to the main negative feed wire 39 and the contact track 67 is connected by a wire 70 to one terminal of the automatic valve 47 while the other terminal of which is connected by a wire 71 to the main positive feed wire 42. The contact track 68 of each pressure device is connected by a wire 72 to a feed wire 73 from which a wire 74 extends to one terminal of the motor 50, the other terminal of which is connected by a wire 75 to the main positive feed wire 42. Another wire 76 extends from the feed wire 73 to one terminal of the motor 57 and from the other terminal a wire 77 extends to the main positive feed wire 42.

When the pressure in one of the gas holding compartments becomes excessive and reaches a predetermined point the diaphragm 60 associated therewith moves the shaft 61 outward and swings the arm 62 on its pivot 63 causing the contact bar 65 to bridge the contact tracks 66, 67, and 68, thereby forming an electrical contact between the three tracks.

When electric contact is formed between the tracks 66 and 67 the electric current passes from the main positive feed wire 42 through the wire 71 to the valve 47 thence through the wire 70 to the contact track 67 and through the contact bar 65 to the contact track 66 from whence it passes through the wire 69 to the main negative feed wire 39, thereby operating the valve 47 to an open position to allow free passage through the lateral conduit 46 with which it is associated.

At the same time the contact bar 65 bridges the contact tracks 66 and 67 it engages the contact track 68 and forms electrical contact between the contact tracks 68 and 66. The electrical current then flows from the main positive feed wire 42 through wires 77 and 75 to the motors 57 and 50 respectively. From the motors 57 and 50 the current passes through wires 76 and 74 respectively to the feed wire 73 from whence it passes through the wire 72 to the contact track 68. From the contact track 68 the current passes through the contact bar 65 to the contact track 66 from whence it passes through the wire 69 to the main negative feed wire 39, thus operating the motor 50 to actuate the pump 49 and the motor 57 to actuate the refrigerating device 56.

When the pressure in the gas holding compartment disminishes to a normal or predetermined point due to the cold air run into the cell 20, the diaphragm 60 operates the arm 65 so that it moves out of contact with the contact tracks 67 and 68, thereby breaking the electric circuit to the motors 50 and 57, whereupon the actuation of the pump 49 and motor 57 ceases.

The wire 38 of each of the heating circuits is preferably provided with a manually operated switch 80 and the wire 69 of each of the cooling circuits is preferably provided with a manually operated switch 81 and master switches 82 and 83 are provided in the main negative and positive feed wires respectively.

From the foregoing description it will be apparent that I have provided an improved construction for gas holding compartments of aircraft which, is of novel construction and is highly efficient in use.

Having thus described my invention, I claim:

1. In an aircraft including a gas holding compartment, a collapsible air cell in said compartment, means to maintain said air cell at a substantially constant volume, said means being operable automatically to supply warm air to said cell when the temperature of said gas holding compartment falls below a predetermined point and to supply cooled air to said air cell when the temperature in said gas holding compartment rises above a predetermined point.

2. In an aircraft including a gas holding compartment, a collapsible air cell associated with said compartment, means to allow air to flow freely into said air cell, means to cool air passing to said compartment, said last means being automatically actuated when the temperature in said gas holding compartment rises above a predetermined point.

3. In an aircraft, a gas holding compartment, a collapsible bag in said compartment, a conduit open to the atmosphere, said conduit including a Venturi tube, a conduit at the throat of said venturi and a heat exchange device actuated by air passing through the throat of said Venturi tube.

4. In an aircraft including a gas holding compartment, a collapsible air cell associated with said compartment, a plurality of means to allow said air cell to freely communicate with the atmosphere, means associated with one of said means to cool air and means associated with the other of said means to heat air.

5. In an aircraft including a gas holding compartment, a collapsible air cell associated with said compartment, means to convey air to and from said air cell and means actuated upon movement of air to said cell to heat the air being conveyed to said air cell.

6. In an aircraft including a gas holding compartment, a flexible container in said compartment, a conduit, said conduit being open to the atmosphere, a passageway from the interior of said conduit to the interior of said container, means to heat air as it passes through said passageway into said container, said means being automatically actuated by the passage of air into said container.

7. In an aircraft including a gas holding compartment, a container in said compartment, said container being in gas tight association with said compartment, means to form a passageway from the interior of said container to the atmosphere, means to heat air in said passageway, said means being automatically actuated by the passage of air into said container, means to cool the air in said container, said means being automatically actuated by increase in pressure of the gases in said compartment to a predetermined point.

8. In an aircraft, a gas holding compartment, a collapsible bag in said compartment, a refrigerating device, means to operate said refrigerating device, a pump, means to operate said pump, a conduit, means connecting said refrigerating device, said pump and said bag to force cooled air into said bag, pressure responsive means in said gas holding compartment and means associated with said pressure responsive means and said refrigerator and pump operating means whereby said pressure responsive means controls and actuation of said refrigerator and said pump operating means.

9. In an aircraft, a gas holding compartment, a collapsible container in said compartment, a conduit, said conduit forming a passageway from the interior of said container to the atmosphere, said container being adapted to be collapsed by the increased volume of the gases in said container and means operable upon the contraction of said gases causing the expansion of said container from a collapsed state thereby causing air to be drawn into said container and means to heat air as it is drawn into said container, said means being automatically controllable by the passage of air into said container.

10. In an aircraft including a gas holding compartment, a container in said compartment, said container being in gas tight association with said compartment, means to form a passageway from the interior of said container to the atmosphere and means to cool the air in said container, said means being automatically actuated by an increase in pressure of the gases in said compartment to a predetermined point.

11. In an aircraft including a gas holding compartment, a container in said compartment, said container being in gastight association with said compartment, means to form a passageway from the interior of said container to the atmosphere, means to heat air in said passageway, said means being automatically actuated by the passage of air into said container.

12. In an aircraft, a gas holding compartment, a collapsible fabric bag in said compartment, said bag being suspended in said compartment, a conduit, said conduit being open to the atmosphere, a second conduit, said second conduit forming a passageway from the interior of said bag to the interior of said first conduit, and said passageway including a Venturi tube, a heating element associated with said second conduit and adapted to heat air in said passageway, a tube, said tube communicating with the interior of said second conduit at the throat of said venturi, suction responsive means in said tube, said means being adapted upon movement of air from said first conduit through said second conduit to actuate said heating element to heat the air as it passes through said second conduit into said bag.

13. In an aircraft, a gas holding compartment, a collapsible fabric bag in said compartment, a conduit, said conduit being open to the atmosphere, a second conduit, said second conduit forming a passageway from the interior of said bag to the interior of said first conduit, said passageway including a Venturi tube, a heating element associated with said second conduit and being adapted to heat air in said passageway, a tube, said tube communicating with the interior of said second conduit at the throat of said venturi, suction responsive means in said tube, said means being adapted upon movement of air from said first conduit through said conduit to actuate said heating element to heat the air as it passes through said second conduit into said bag, a refrigerating device, a pump, means to operate said pump, a third conduit, means connecting said refrigerating device and said pump to force cooled air into said third conduit, a fourth conduit, said fourth conduit communicating with the interior of said third conduit and extending through said first and second conduits into said bag, pressure responsive means in said gas holding compartment, operating means associated with said pressure responsive means and said refrigerator and pump operating means whereby said pressure responsive means controls the actuation of said two operating means, said pressure responsive means being adapted to actuate to operate said refrigerator and said pump operating means when the pressure in said gas holding compartment rises to a predetermined point to thereby cause cooled air to be forced through said third and fourth conduits into said bag.

In testimony whereof, I hereunto affix my signature.

CHARLES S. HALL.